Patented Apr. 9, 1940

2,196,580

UNITED STATES PATENT OFFICE 2,196,580

PRODUCTION OF USEFUL CHEMICALS FROM ISOMERIC MONO - NITRO - ORTHO - DICHLOROBENZENE MIXTURES

Frank B. Smith and John N. Hansen, Midland, Mich., assignors to The Dow Chemical Company, Midland, Mich., a corporation of Michigan No Drawing. Application January 5, 1939,
Serial No. 249,542

6 Claims. (Cl. 260—622)

This invention concerns the conversion of a mixture of mono-nitro-ortho-dichlorobenzene isomers into valuable chemical agents which may readily be isolated as the pure compounds.

In the manufacture of 3,4-dichloro-nitrobenzene by nitration of ortho-dichlorobenzene, the reaction product contains a major proportion of 3,4-dichloro-nitrobenzene and a minor proportion of 2,3-dichloro-nitrobenzene. A part of the 3,4-dichloro-nitrobenzene in the mixture may be separated by fractional crystallization, leaving an eutectic mixture of 2,3-dichloro- and 3,4-dichloro-nitrobenzenes. This eutectic mixture cannot readily be separated into its components by fractional distillation or crystallization or by any other method as yet known. It is not adapted to the present uses for pure 3,4-dichloro-nitrobenzene, and it has heretofore been discarded as a useless by-product. An object of this invention is to provide a method whereby this eutectic mixture may be converted into valuable compounds which are readily separable from one another in pure form. Other objects will be apparent from the following description of the invention.

We have discovered that by subjecting a mixture of 2,3-dichloro-nitrobenzene and 3,4-dichloro-nitrobenzene to hydrolysis the valuable products 2-chloro-4-nitrophenol and 2-chloro-6-nitrophenol may be formed in good yield, and that these products may be isolated without difficulty in pure form. The chloro-nitrophenol products are useful as chemical agents from which a wide variety of other products, e. g. resins, dyes, etc., may be prepared. The 2-chloro-4-nitro-phenol is particularly useful as a preservative against fungus attack on leather.

The mixture of isomeric dichloro-nitrobenzenes is hydrolyzed by heating the same with an aqueous alkali in the usual manner. The alkali employed may be sodium hydroxide, potassium hydroxide, calcium hydroxide, or other of the alkalies heretofore used for the hydrolysis of nuclear halogenated aromatic hydrocarbons. Usually between 1 and 2.5, preferably about 2, chemical equivalents of alkali are used per mole of dichloro-nitrobenzene, but the alkali may be employed in any other proportion desired. When used in a proportion less than that chemically equivalent to the mixture of dichloro-nitrobenzenes, the 2,3-dichloro-nitrobenzene is hydrolyzed more rapidly than its isomer and partial separation of the 3,4-dichloro-nitrobenzene may be effected. However, we prefer to employ sufficient alkali to hydrolyze both isomers and subsequently to separate the phenolic products. The aqueous alkali is usually employed in a concentration between 2 and 15 per cent by weight, preferably between 5 and 10 per cent, but it may be used in lower or somewhat higher concentrations, if desired.

The hydrolysis is accomplished by heating the reaction mixture under pressure in a closed reactor at temperatures of between 125° and 200° C., preferably between 150° and 175° C. The reaction is usually complete after from 5 to 10 hours of heating, although longer heating may in some instances be required.

The reacted mixture contains the phenolic products in salt form, and the salt of 2-chloro-4-nitrophenol usually crystallizes on cooling the mixture to room temperature or thereabout. In some instances, partial evaporation of the mixture may be desirable in order to obtain a good recovery of this crystalline salt. The crystalline salt is separated from the liquor, washed with water, acidified to liberate the 2-chloro-4-nitrophenol, and the latter is purified, when necessary, by crystallization, and dried. This 2-chloro-4-nitrophenol product is a white, crystalline material having a melting point of 110.5° to 111° C. The liquor remaining after crystallizing the salt of the 2-chloro-4-nitrophenol from the crude reacted mixture is extracted with a suitable solvent, such as benzene, chlorobenzene, ortho-dichlorobenzene, toluene, xylene, etc., for purpose of removing any unreacted dichloro-nitrobenzene therefrom. It is then acidified with a mineral acid, such as sulphuric or hydrochloric acid, to liberate the 2-chloro-6-nitrophenol product. The latter is isolated and purified in conventional manner, e. g. by crystallization or steam distillation, etc.

The following example describes one way in which the principle of the invention has been applied, but is not to be construed as limiting the invention:

Example

An eutectic mixture containing about 60 per cent of 3,4-dichloro-nitrobenzene and about 40 per cent of 2,3-dichloro-nitrobenzene was subjected to hydrolysis. 48 grams (0.25 mol) of this eutectic mixture, 21.3 grams (0.5 mol) of sodium hydroxide, and 245 cc. of water were heated together with stirring in an autoclave at a temperature of 150° C. for 8 hours. The autoclave was then cooled and the charge removed. The reacted mixture was an aqueous slurry of orange-colored crystals of sodium 2-chloro-4-nitrophenolate. The crystalline material was separated by filtration, washed with benzene, and water was added to form an aqueous slurry. The slurry was rendered slightly acid by addition of hydrochloric acid to liberate the 2-chloro-4-nitrophenol and the latter was separated by filtration, washed with water and dried. It was a white crystalline compound melting at about 111° C. The reaction liquor remaining after crystallization of the sodium 2-chloro-4-nitrophenolate was washed with chlorobenzene for purpose of extracting any unreacted dichloro-nitrobenzene therein. It was then rendered slightly acid by addition of a dilute aqueous nitric acid solution, whereby 2-chloro-6-nitrophenol was liberated from its sodium salt and precipitated in crude form as an orange-colored oil. The 2-chloro-6-nitrophenol was steam distilled from this oil and was subsequently purified by recrystallization from ethanol. It was obtained in the form of bright yellow crystals having a melting point of 70° to 70.4° C. The yield of 2-chloro-4-nitrophenol was approximately 50 per cent of theoretical, based on the proportion of 3,4-dichloro-nitrobenzene in the isomeric dichloro-nitrobenzene mixture initially employed, and the yield of 2-chloro-6-nitrophenol was approximately 62 per cent of theoretical, based on the 2,3-dichloro-nitrobenzene in the same initial isomeric mixture.

Although the method as hereinbefore described is usually applied in preparing chloro-nitrophenols from the eutectic mixture of dichloro-nitrobenzenes described in the above example, it is not restricted thereto. When desired, a mixture of 2,3-dichloro-nitrobenzene and 3,4-dichloro-nitrobenzene containing said compounds in any proportions may be subjected to the hydrolysis to produce the 2-chloro-4-nitrophenol and 2-chloro-6-nitrophenol products, and said products may be separated without difficulty from one another by crystallization of their alkali metal or alkaline earth metal salts from aqueous solution. Also, the hydrolysis may, if desired, be carried out using an aqueous alcohol solution, e. g. a solution of methyl or ethyl alcohol, instead of water alone as the reaction medium.

Other modes of applying the principle of the invention may be employed instead of those explained, change being made as regards the method herein disclosed, provided the step or steps stated by any of the following claims, or the equivalent of such stated step or steps, be employed.

We therefore particularly point out and distinctly claim as our invention:

1. The method which comprises hydrolyzing a mixture of 2,3-dichloro-nitrobenzene and 3,4-dichloro-nitrobenzene to produce 2-chloro-6-nitrophenol.

2. The method which comprises hydrolyzing a mixture of 2,3-dichloro-nitrobenzene and 3,4-dichloro-nitrobenzene to produce 2-chloro-6-nitrophenol and 2-chloro-4-nitrophenol.

3. The method which comprises hydrolyzing a mixture of 2,3-dichloro-nitrobenzene and 3,4-dichloro-nitrobenzene and separating from the reacted mixture a product selected from the class consisting of 2-chloro-4-nitrophenol and 2-chloro-6-nitrophenol.

4. The method which comprises hydrolyzing a mixture of 2,3-dichloro-nitrobenzene and 3,4-dichloro-nitrobenzene by heating said mixture of isomers with an aqueous base selected from the class consisting of alkali metal and alkaline earth metal bases at a temperature between 125° and 200° C.

5. The method which comprises hydrolyzing an isomeric mixture containing about 60 per cent by weight of 3,4-dichloro-nitrobenzene and about 40 per cent of 2,3-dichloro-nitrobenzene by heating the isomeric mixture with a dilute aqueous solution of an alkali metal hydroxide at a reaction temperature between about 125° and about 200° C.

6. The method which comprises hydrolyzing an isomeric mixture containing about 60 per cent by weight of 3,4-dichloro-nitrobenzene and about 40 per cent of 2,3-dichloro-nitrobenzene by heating said isomeric mixture at superatmospheric pressure to a reaction temperature between about 125° and about 175° C. with a dilute aqueous solution of an alkali metal hydroxide, and thereafter separating 2-chloro-4-nitrophenol and 2-chloro-6-nitrophenol from the reaction mixture.

FRANK B. SMITH.
JOHN N. HANSEN.